United States Patent
Bacon et al.

(10) Patent No.: US 6,430,538 B1
(45) Date of Patent: Aug. 6, 2002

(54) WORKFLOW MANAGEMENT SYSTEM, METHOD AND MEDIUM WITH PERSONAL SUBFLOWS

(75) Inventors: Ian D. Bacon, Manassas, VA (US); Carl T. Bean, New Market, MD (US); James M. Handy, III, Haymarket, VA (US)

(73) Assignee: Enterworks, Ashburn, VA (US)

( * ) Notice: Subject to any disclaimer, the term of this patent is extended or adjusted under 35 U.S.C. 154(b) by 0 days.

(21) Appl. No.: 09/070,636

(22) Filed: Apr. 30, 1998

(51) Int. Cl.$^7$ ............................................. G06F 17/30
(52) U.S. Cl. ........................................ 705/9; 707/104
(58) Field of Search ........................ 707/7, 104; 705/1, 705/9; 709/106, 100

(56) References Cited

U.S. PATENT DOCUMENTS

| | | |
|---|---|---|
| 4,503,499 A | 3/1985 | Mason et al. |
| 5,181,162 A | 1/1993 | Smith et al. |
| 5,216,603 A | 6/1993 | Flores et al. |
| 5,239,617 A | 8/1993 | Gardner et al. |
| 5,301,320 A | 4/1994 | McAtee et al. |
| 5,535,322 A | 7/1996 | Hecht |
| 5,535,323 A | 7/1996 | Miller et al. |
| 5,564,044 A | 10/1996 | Pratt |
| 5,581,691 A | 12/1996 | Hsu et al. |

(List continued on next page.)

OTHER PUBLICATIONS

Alonso et al. (1997) *Proc. IEEE Int. Workshop on Research Issues in Data Eng.*, pp. 82–90.
Bauer et al. (1997) *Proc. of the IFCIS Int. Conf. on Cooperative Information Systems*, pp. 99–108.
Ceri et al. (1997) *Proc. IEEE Int. Workshop on Research Issues in Data Eng.*, pp. 76–79.
Huang et al. (1996) Proc. of the 1996 ESDA 79(7):123–129.
Workflow Management Coalition: The Workforce Reference Model, Issue 1.1 (Nov. 29, 1994).
Workflow Management Coalition: Workflow Client Application (Interface 2 Application Programming Interface (WAPI) Specification, Version 1.2 (Oct. 1, 1996).
Workflow Management Coalition: Terminology & Glossary, Issue 2.2 (Jun. 1996).
Workflow Management Coalition: The WorkFlow Management Coalition Specification,Document Status—Issue 2.0 (Jun., 1996).
Hollingsworth, David; Workflow Management Coalition The Workflow Reference Model; Workflow Management Coalition; Document No. TC00–1003; Document Status—Issue 1.1 (Jan. 19, 1995).
Workflow Management Coalition: Workflow Management Application Programming Interface (Interface 2) Specification, Document No. TC00–0009 (Oct. 1, 1996).

*Primary Examiner*—Wayne Amsbury
(74) *Attorney, Agent, or Firm*—Hale and Dorr LLP (57) ABSTRACT

Workflow management system and method with personal subflows. A workflow system includes a workflow definition including an activity to be performed by a personal subflow. The personal subflow is defined by personal subflow activities and branch expressions associated with the subflow activities. A server interprets the workflow definition and facilitates the scheduling and routing of work items in the system. A client receives work items from the server and displays information therefrom to a participant. The client also receives data and control commands from the participant. A decision agent cooperates with the server in the scheduling of work items by considering participant-provided data and a branch expression associated with a current personal subflow activity.

26 Claims, 9 Drawing Sheets

U.S. PATENT DOCUMENTS

| | | |
|---|---|---|
| 5,666,490 A | 9/1997 | Gillings et al. |
| 5,689,625 A | 11/1997 | Austin et al. |
| 5,710,921 A | 1/1998 | Hirose |
| 5,721,913 A | 2/1998 | Ackroff et al. |
| 5,734,837 A * | 3/1998 | Flores et al. ......... 395/207 |
| 5,754,857 A * | 5/1998 | Gadol ......... 709/203 |
| 5,799,297 A | 8/1998 | Goodridge et al. |
| 5,826,239 A | 10/1998 | Du et al. |
| 5,837,388 A * | 11/1998 | Doko et al. ......... 148/438 |
| 5,867,824 A | 2/1999 | Saito et al. |
| 5,930,512 A * | 7/1999 | Boden et al. ......... 717/10 |
| 5,937,411 A | 8/1999 | Becker |
| 5,987,513 A | 11/1999 | Prithviraj et al. |
| 5,999,911 A * | 12/1999 | Berg et al. ......... 705/9 |
| 6,012,067 A | 1/2000 | Sarkar |
| 6,014,135 A * | 1/2000 | Fernandes ......... 345/744 |
| 6,067,477 A * | 5/2000 | Wewalaarachichi et al. .. 700/83 |
| 6,078,982 A * | 6/2000 | Du et al. ......... 707/8 |
| 6,192,165 B1 * | 2/2001 | Irons ......... 382/306 |

* cited by examiner

WORKFLOW MANAGEMENT SYSTEM, METHOD AND MEDIUM WITH PERSONAL SUBFLOWS

CROSS-REFERENCE TO RELATED APPLICATIONS

This application is related to the following applications, all of which are filed on the same date as this application, all of which are assigned to the assignee of this application, and all of which are hereby incorporated by reference in their entirety:

Workflow Management System, Method, and Medium that Morphs Work Items (U.S. application Ser. No. 09/070,639, now pending); and Workflow Management System, Method, and Medium with Distributed Subflows (U.S. application Ser. No. 09/070,635, now abandoned).

BACKGROUND OF THE INVENTION

1. Field of the Invention

The present invention relates generally to computerized workflow management and, more particularly, to a workflow management system and method that provides personal subflow processing.

2. Discussion of Related Art

"Workflow" is the automation of a business process, in whole or part, during which documents, information, or tasks are passed from one "activity" to another according to a defined "business process." A "business process" is a defined set or sequence of procedures or activities that collectively realize a business objective or policy goal. An "activity" is a description of a piece of work that forms one logical step within a business process or workflow performed by an "actor." An activity may involve human resources (i.e., a "participant") to support the execution of the activity, or it may involve automatic execution via a software "agent." The "work item" represents the life cycle, or state, of a body of work as it passes through a workflow. A "workflow management system" provides procedural automation of a business process by managing the sequence of work activity and by invoking the appropriate human and/or computer resources associated with the various activity steps involved in the defined business process.

Over the years, many workflow management products have been introduced often particularly focusing on functional needs of a specific business processes. These systems are largely incompatible with other workflow systems, thus making it extremely difficult and costly for one workflow management system, for example, to interoperate with another workflow management system. This is undesirable because often the systems that cannot interoperate are considered related in a business sense.

To address the above, the Workflow Management Coalition (WFMC) was established with a stated purpose of developing specifications to facilitate interoperability between heterogeneous workflow products and to improve integration of workflow applications with other information technology (IT) services, such as electronic mail and document management. To this end, the WfMC developed and published a workflow reference model which, among other things, outlines a generic workflow model and various interfaces. See DAVID HOLLINGSWORTH, WORK-FLOW MANAGEMENT COALITION, THE WORK-FLOW REFERENCE MODEL, Document No. TC00-1003, which is hereby incorporated by reference in its entirety. The Coalition has further provided a specification of terminology and of the various interfaces. See, respectively, WORK-FLOW MANAGEMENT COALITION, TERMINOLOGY AND GLOSSARY, Document No. WfMC-TC-1011, which is hereby incorporated by reference in its entirety, and WORKFLOW MANAGEMENT COALITION, WORK-FLOW CLIENT APPLICATION (INTERFACE 2) APPLICATION PROGRAMMING INTERFACE (WAPI) SPECIFICATION, Document Number WfMC-TC-1009, which is hereby incorporated by reference in its entirety. The various standards and specifications are silent on implementation details of any of the various components and primarily focus on interfaces. Moreover, to the extent that interfaces are discussed with any specificity beyond an abstract model, they are discussed with reference to the 'C' programming language.

For example, the WfMC defines the concept subprocess as "a process that is enacted or called from another (initiating) process or (or sub-process) and which forms part of the overall (initiating) process." In this regard, the definition is akin to a subroutine in linear programming.

In conventional workflow management systems, a work item is a representation of a document or information being passed through a business process. Although the contents of that document may change along its transition from activity to activity, the "type" of the item remains unchanged. For example, if a word processing document is being routed through a workflow, each participant or agent receives a copy of the word processing document. In short, conventional systems are document- or form-centric.

For example, Lotus Notes, available from IBM, is a collaborative mail-based system in which specific documents are passed through a proprietary interface and modified by an end-user and then passed to a next end-user. The same document is in use at all times. InConcert, available from InConcert, is an object-based system having a proprietary messaging protocol in which each action is associated with a single, specific display type. To transform information from one display to another requires manual intervention. Metro, available from Action Technologies, is a document and forms passing system in which the forms may be displayed in a browser.

The conventional systems require that each entity involved in a given workflow must understand and be able to process the data type that is being used by all other entities. This places restrictions on the types of entities that may be incorporated into a workflow. If another data type is needed a separate workflow must be initiated. This is not only inefficient but introduces its own inherent interoperability concerns.

Thus, since each of the activities operates on the same type of work item, e.g., a document, any subprocesses likewise operate on the same form of work item. Moreover, to the extent that subprocesses are actually implemented they are implemented on the same server as the originating workflow. This is almost definitional from the WfMC's definitional reliance on "enactment" and what that term means in the WfMC paradigm.

Moreover, the conventional systems centralize the processing to wherever the workflow is enacted. This is disadvantageous in enterprise computing where one physical location may perform a function, e.g., accounting, which other branches and locations need but which the other branches need not know the details of how the particular function is performed. Centralizing the processing requires the centralization of definition and to a large extent centralization of thinking, defeating some of the advantages of distributing the workplace into autonomous or relatively autonomous units. Moreover, in conventional subprocesses the actors are effectively "hardcoded" into the definition. That is, the subprocess will be defined in a way that explicitly specifies who the participants are and what the agents will be. This "hardcoding" limits the amount of usability and re-usability of the subprocess as only the specified actors may perform the subprocess activity. Lastly, all known implementations of WfMC subprocesses are unidirectional graphs. Thus, one activity is followed by a different activity which is followed by yet a different activity and so on. This unidirectional nature prevents many useful real-world processes from being implemented as a flow. At a theoretical level it may be elegant to think that a given process may be easily defined as a unidirectional sequence of activities, but in the real-world some processes require trial-and-error iteration. This requires a potential cycle in that a participant may want to go back, or unwind, to a prior activity and then repeat the activities anew.

Thus, it is an object of the invention to provide a workflow management system and method that overcomes the above disadvantages. It is another object of the invention to provide a workflow management system and method that improves the reusability of subprocess definitions. It is yet another object of the invention to provide a workflow management system and method that allows personal subflows to execute as an unconstrained sequence of activities.

SUMMARY

Preferred embodiments of the invention provide a workflow management system that improves interoperability by allowing personal subflows. The personal subflow does not have any explicit definition of participants or agents. Instead this information is linked or bound at run-time for the personal subflow, not at definition-time.

Under a preferred embodiment, a workflow system includes a workflow definition including an activity to be performed by a personal subflow. The personal subflow is defined by personal subflow activities and branch expressions associated with the subflow activities. A server interprets the workflow definition and facilitates the scheduling and routing of work items in the system. A client receives work items from the server and displays information therefrom to a participant. The client also receives data and control commands from the participant. A decision agent cooperates with the server in the scheduling of work items by considering participant-provided data and a branch expression associated with a current personal subflow activity.

DETAILED DESCRIPTION

The present invention provides certain embodiments of a workflow management system and method that provide personal subflow processing. A personal subflow definition is not bound to an explicit set of actors and thus improves re-usability. A personal subflow is not constrained to unidirectional graphs. A personal subflow may cooperate with an expert agent to perform activities in need of expert assistance.

1. System Overview

Figure 1:
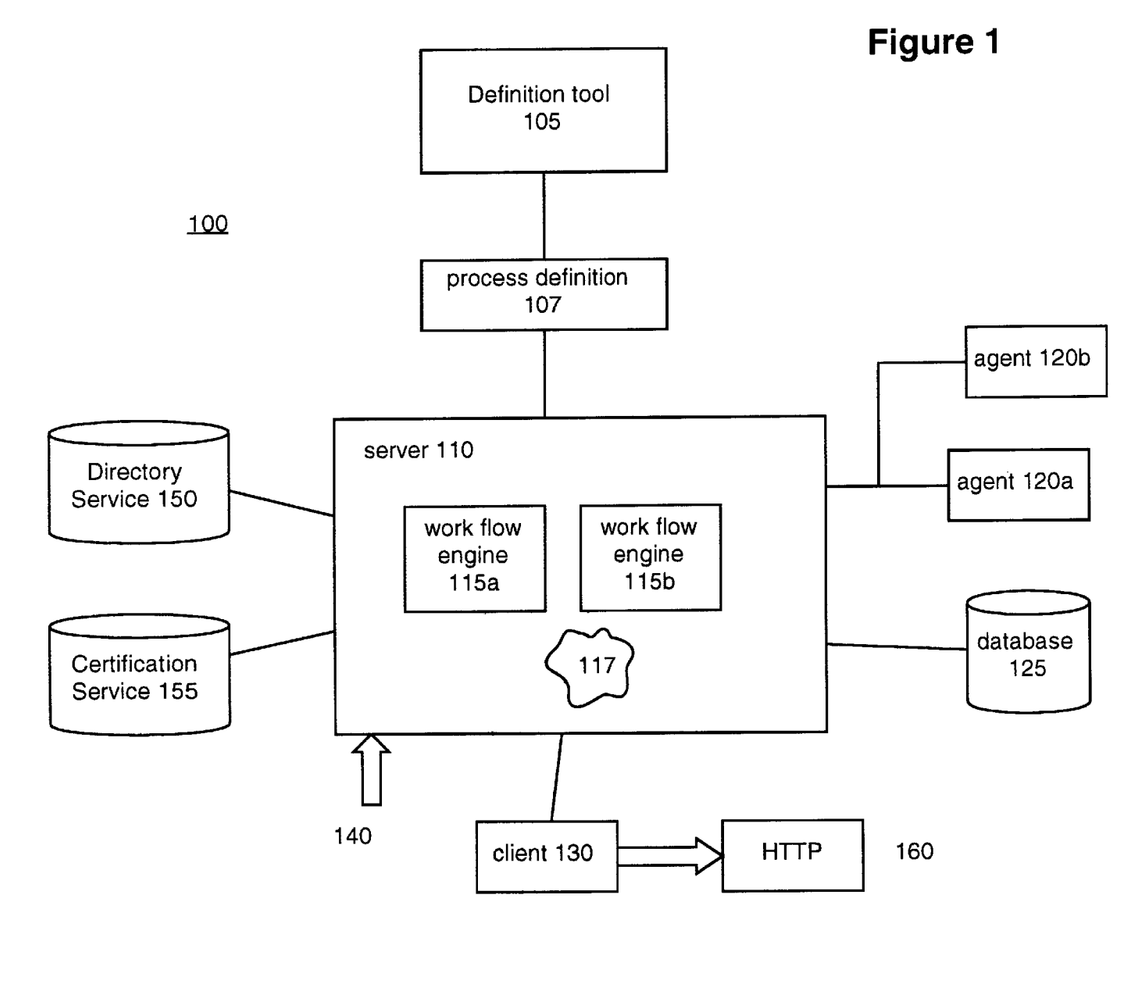
FIG. 1 is a system diagram of an exemplary embodiment of the invention.

FIG. 1 shows a workflow management system 100. The primary components are process definition tool 105, server 110 (having engines 115a–b), agents 120a–b, database 125, and client 130. Preferred embodiments further include administration interface 140, LDAP services 150, certificate services 155, and HTTP server 160.

The process definition tool 105 is used to create a process definition 107 that represents the desired business process in a computer-interpretable form. The definition tool 105, for example, may have a graphical user interface (GUI) that may be used to specify a business process by dragging and dropping various iconic representations of the various activities, the participants, agents, and interrelationships involved in a given process. The interrelationships may follow those specified in the WfMC model, such as OR-split, OR-join, AND-split, and AND-join. The process definition 107 may further include information identifying starting and completion conditions for the various activities. The definition tool 105 may also include capabilities to check for certain functional and semantic correctness or validity of the specified process definition 107. Once defined, the process definition 107 may be stored in the database 125 for later use when executing a workflow.

The server 110 effectively interprets the process definition 107 and cooperates with the clients 130 and agents 120 to schedule the sequence of the various process definition-specified activities. More specifically, the server 110 may include one or more engines 115, in which each engine individually or with a co-operating engine schedules the sequence of activities of a given process 107 with the cooperation of an agent 120 or client 130. Moreover, each engine 115 together with cooperating agents and clients makes scheduling decisions from considering (1) the definition 107, (2) status information from agents 120 and clients 130 (e.g., completion status of an activity), and (3) other external and/or internal events. Upon determining that an activity may be started, the engine 115 routes a given work item 117 to the appropriate actors, such as agents 120, clients 130, or possibly a work group (not shown) where an activity is performed. For certain types of activity interrelationships, the engine 115 may clone a work item 117 and route cloned work items to several actors.

Agent 120 is a software entity responsible for autonomously implementing a given activity. By "autonomous" it is meant that no human action is needed in performing this activity. The process definition 107 may identify or reference a given agent 120a to indicate which software entity is responsible for performing a given activity within the process definition 107. Each agent 120 receives and sends work items 117.

Database 125 is used for persistent storage. This may be used to store process definitions 107 and various objects.

Under a preferred embodiment, work items 117 are stored in the database 125 after each activity is performed, and read from the database 125 each time a work item 117 is sent to an actor. Work item identifications (IDs) are used to address the items and to distinguish work items that belong to different workflows or to distinguish work items in the same flow, but at different activity stages.

Clients 130 are software entities that operate in conjunction with an end-user or "participant" (i.e., a person) rather than autonomously like an agent. This interaction with an end-user may occur through a generalized or customized GUI or application (e.g., "task manager logic").

Administration interface 140 allows a supervisor, i.e., a person, to manage the system as required.

LDAP services 150 provide directory services. These services are used for maintaining a centralized database of network users who may or may not be users of the workflow system.

Certificate services 155 provide certificates which may be used for authentication, digital signing and corresponding security transactions.

Figure 2:
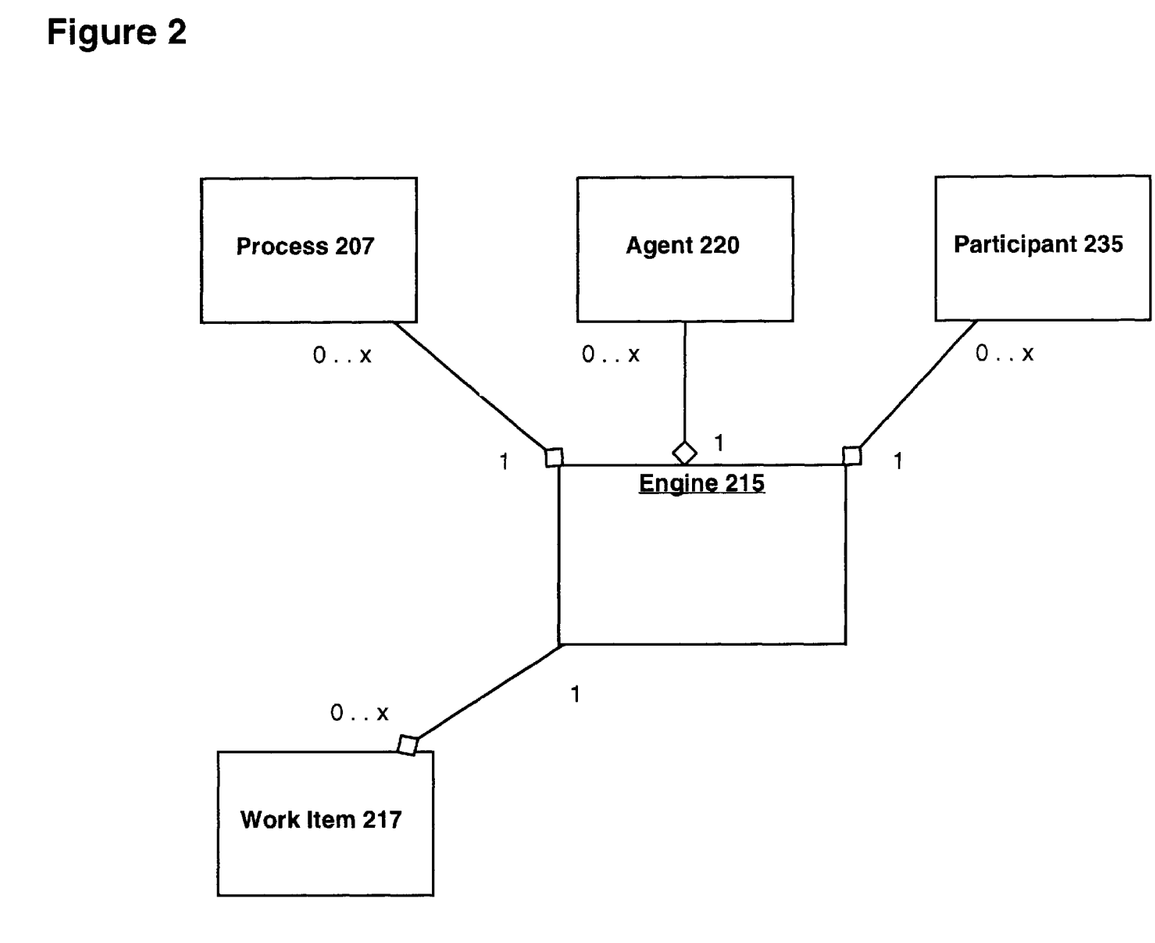
FIG. 2 is a UML description of an exemplary flow engine object with associated objects.
Figure 8:
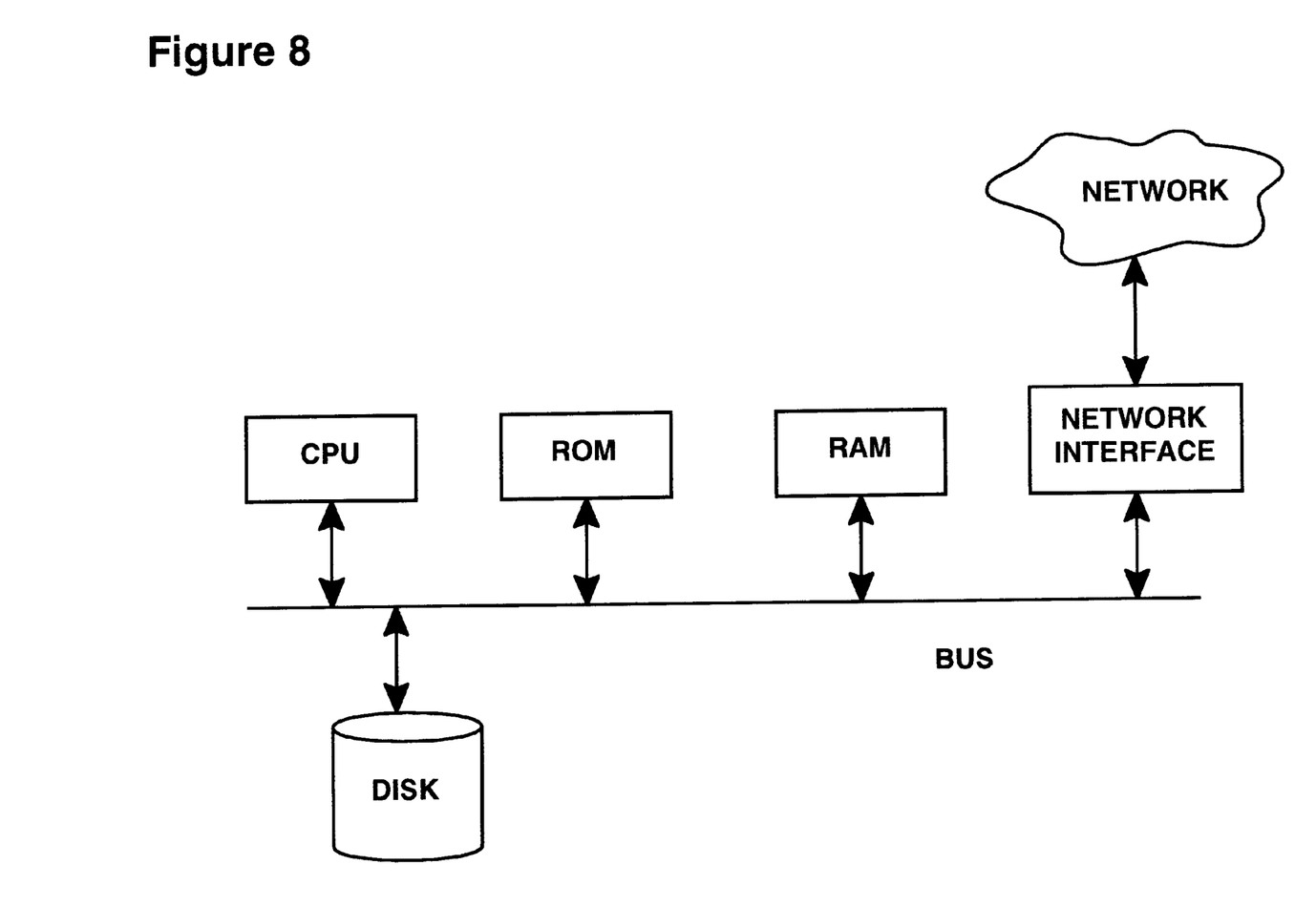
FIG. 8 illustrates an exemplary platform on which an exemplary server, client, or agent may operate.

Under a preferred embodiment, the server 110, the engines 115a–b, and certain aspects of the client 130 are implemented with the Java programming language (e.g., JDK 1.1). Likewise, though it is agent implementation-specific, the agents 120 may be implemented in Java. Using conventional Java programming techniques, a given workflow engine 115a is associated with other objects, as shown in the Unified Modeling Language (UML) description of FIG. 2. (UML is a notation known in the art) Specifically, engine 215 is associated with zero or more work items 217; zero or more process definitions 207 (e.g., subprocesses); zero or more agents 220; and zero or more participants 235. It may be further associated with a work group (not shown) in which several actors are grouped together for load balancing or other group-related functions. The flow engine 115 and server 110 interact with database 125, which is preferably implemented as an Object Database Management Group-compliant (ODMG-compliant), object-oriented database, available from Poet. The Poet database 125 is a multi-transaction and multi-threaded database that, among other things, provides Java bindings to facilitate persistence of the Java objects used in implementing the server 110 and engines 115. Java, being an interpretable language, is processor independent. An exemplary platform on which it, and thus the server, clients, and agents, may operate is shown in FIG. 8.

Under a preferred embodiment, work items 117 are implemented using Java, but extended to improve persistence via database 125. Preferred work item objects 117 include a Java hash table (discussed below) and may be extended, via subclassing, to have other properties and logic. These extensible objects may be used, for example, when objects are distributed to other servers.

Figure 3:
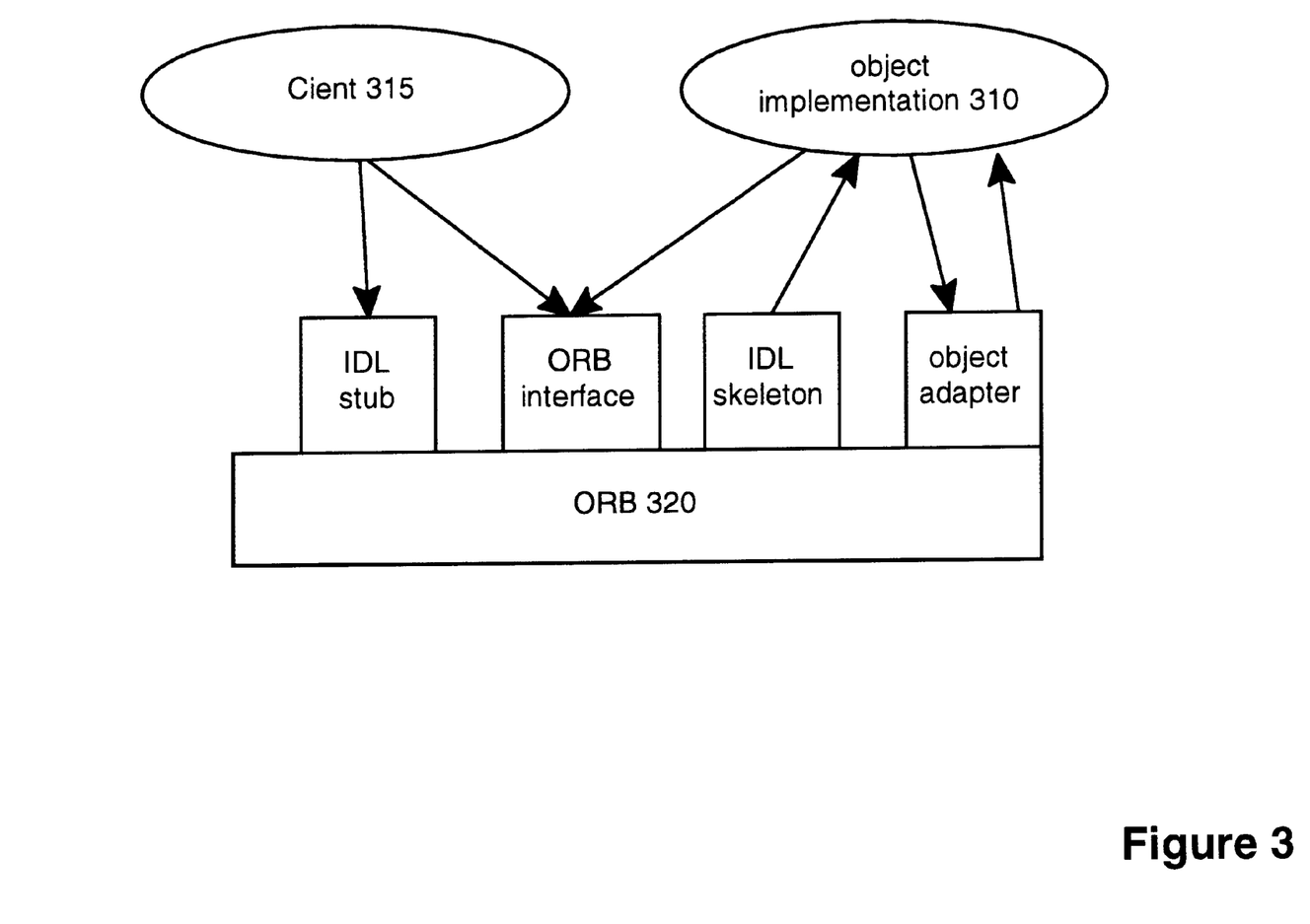
FIG. 3 is an architectural diagram illustrating the distribution of objects using an ORB.

A preferred embodiment of the server 110 distributes work item objects 117 between server 110 and clients 130, agents 120, and potentially other workflow servers (not shown in FIG. 1). This relationship is established using an object request broker (ORB) in accordance with the common object request broker architecture (CORBA). Under this relationship, as shown in FIG. 3, the server 110 contains the object implementation 310, and the client or the agents (collectively 315) have access mechanisms to that object implementation via the ORB 320. These access mechanisms are implemented with conventional techniques, for example, using the object management group's (OMG's) interface definition language (IDL). Though the object implementation is on the server 110, the object seems to reside locally both from the perspective of the actors and the server.

The preferred implementation instantiates only one process definition 107, which is used no matter how many workflows, defined by that process, are concurrently executing on server 110. The process definition 107 is effectively shared among the workflows and each flow is kept distinct through proper identification of the associated work items 117. This is in contrast to WfCM specifications which suggest a new "enactment" of a process definition for each workflow. The preferred arrangement, by sharing the definition 107, significantly reduces load on the server 110, thus allowing it to serve more workflows concurrently, and reduces storage requirements on database 125.

Figure 4:
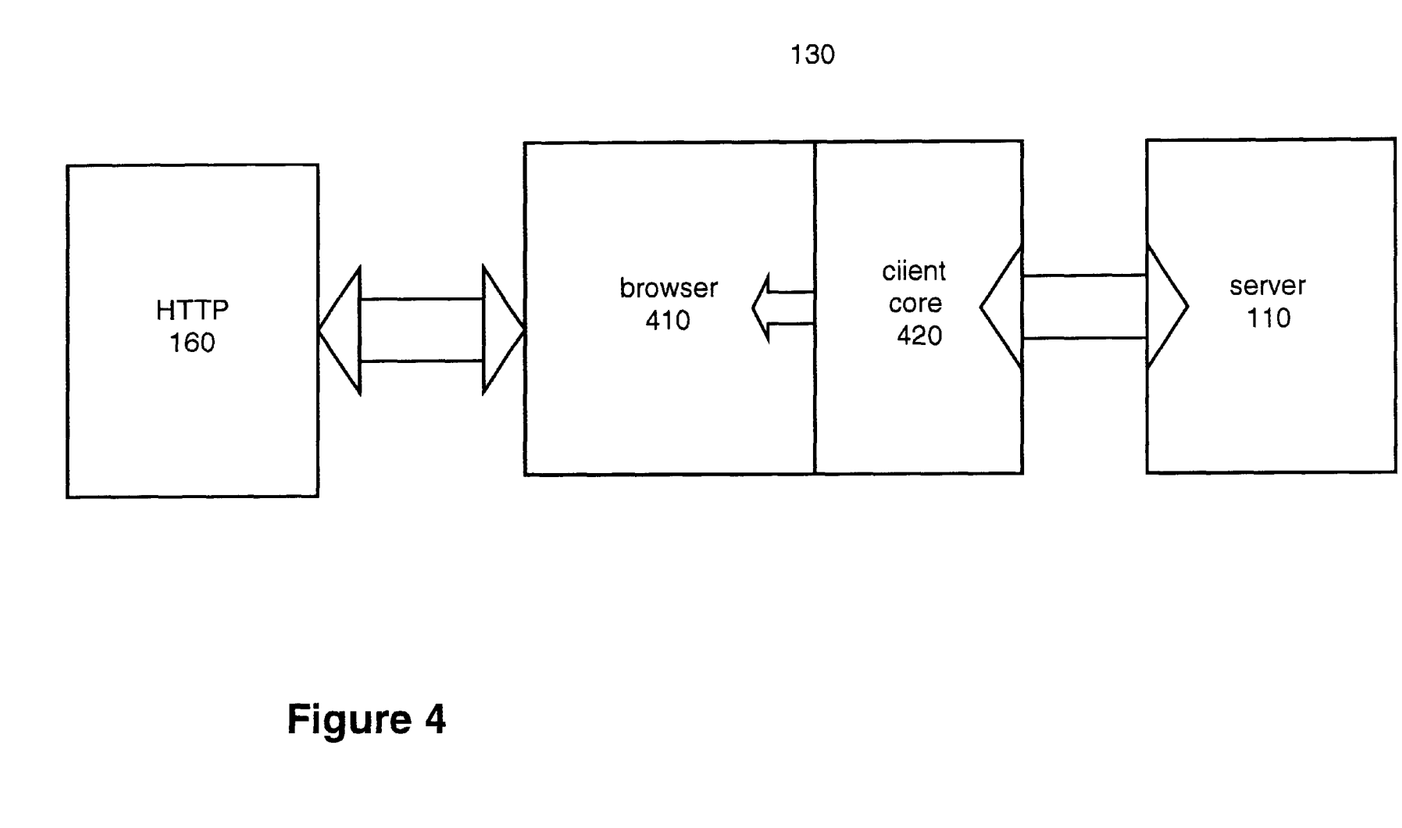
FIG. 4 is a system diagram of an exemplary client.

FIG. 4 illustrates a client 130 at a high level of abstraction. Client 130 includes a browser component 410 and a client core component 420. Under preferred embodiments, browser component 410 may be the Netscape browser version 4.04. However, core component 420 is designed to run with any java-compliant browser. The browser component 410 establishes or is caused to establish a context or environment in which the client core component 420 operates. For example, in the Netscape environment, conventional techniques (e.g., Live Connect) may be used to allow plug-ins, applets, and other components to communicate with one another via registered communication interests. Explorer has analogous features (e.g., Active X). The core component 420 would include task manager logic (not shown), for example, providing a GUI having an iconically-represented "in-box" of iconically-represented, to-be-completed work items.

2. Client-Based HTML Applications, and Scheduling, Routing, and Morphing of Work Items The preferred logic for implementing client-based applications and scheduling, routing, and morphing of work items is described in a U.S. Patent Application, entitled Workflow Management System, Method, and Medium that Morphs Work Items, which is filed on the same date as this application and assigned to the same assignee and which is hereby incorporated by reference in its entirety. For the sake of brevity, that description is only partially repeated here.

Figure 5:
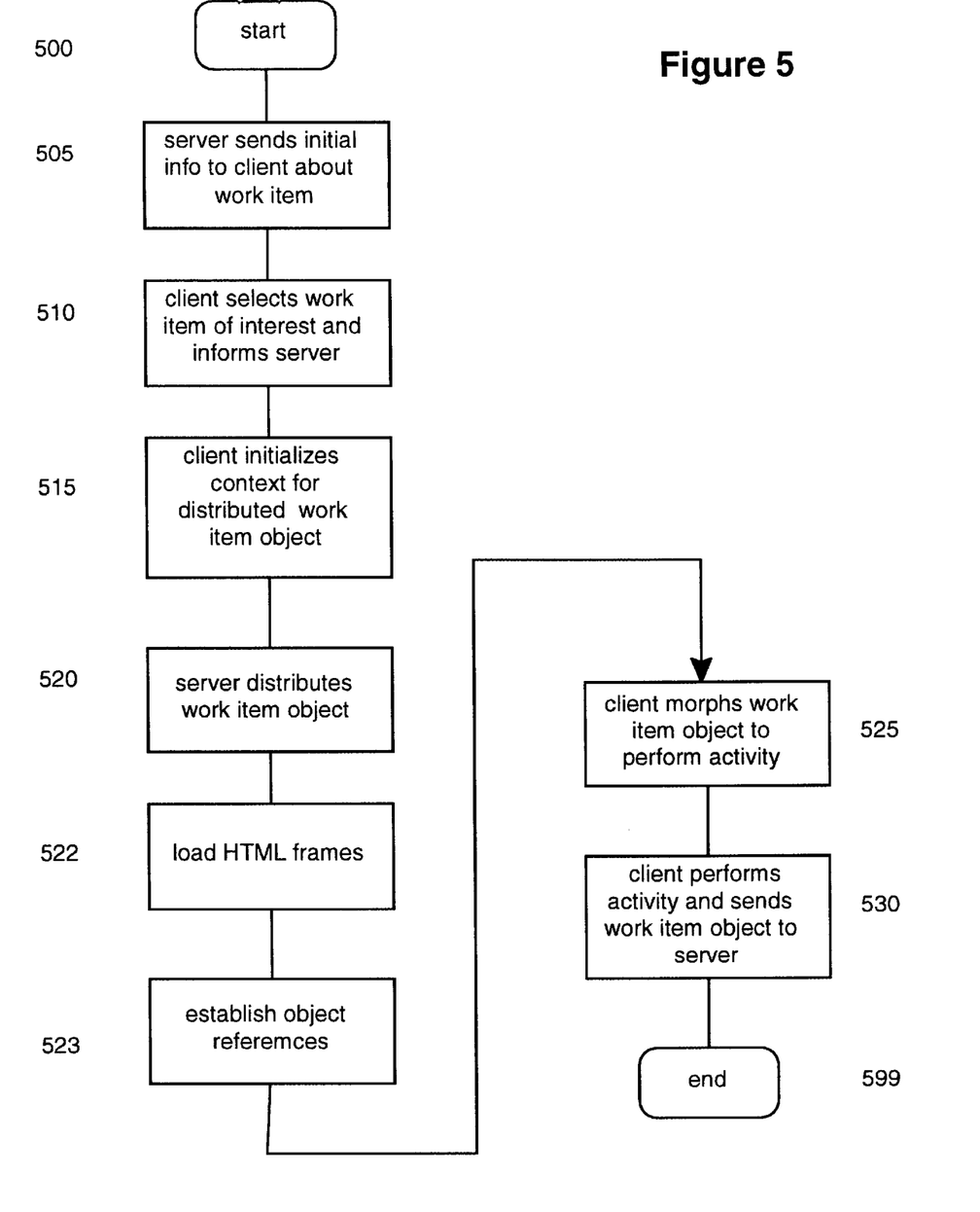
FIG. 5 is a flow chart of the logic for client-based applications of an exemplary embodiment of the invention.

The logic for implementing client-based applications is shown in the flow chart of FIG. 5. The logic starts in step 500 and proceeds to step 505.

In step 505, the server 110 sends a work item event message to a client of interest 130 indicating that a work item object 117 has been scheduled for that activity. Clients 130 (specifically task manager logic) each include conventional event listening logic which is registered with the server 110 to listen for new work item events. In response to receiving a new work item event, the client requests from the server 110 a refresh of the client's in-box. The server obtains the "in-box" information from the database 125 and sends it to the client. The in-box information includes the names of the work items assigned to the client (each work item being named using conventional naming techniques such as OQL) and may include other work item related information such as corresponding priority information, URL references to HTML pages, or the like. The work item-related information is determined from the engine 115, the definition 107, the state of the workflow, and the database 125.

The client selects a work item of interest from its in-box in step 510 indicating it's ready to begin the activity. This may be performed from a participant selecting an iconic representation of a work item in the client's task manager window. The selection causes a selection message to be sent to the server 110 indicating that a given work item has been selected. The client, in step 515, initializes or establishes a context into which the work item object 117 may be distributed. (Though the various logic steps may be re-arranged in many other sequences and remain operative, it warrants emphasis that step 515 could easily precede or operate concurrently with step 510.)

Figure 6A:
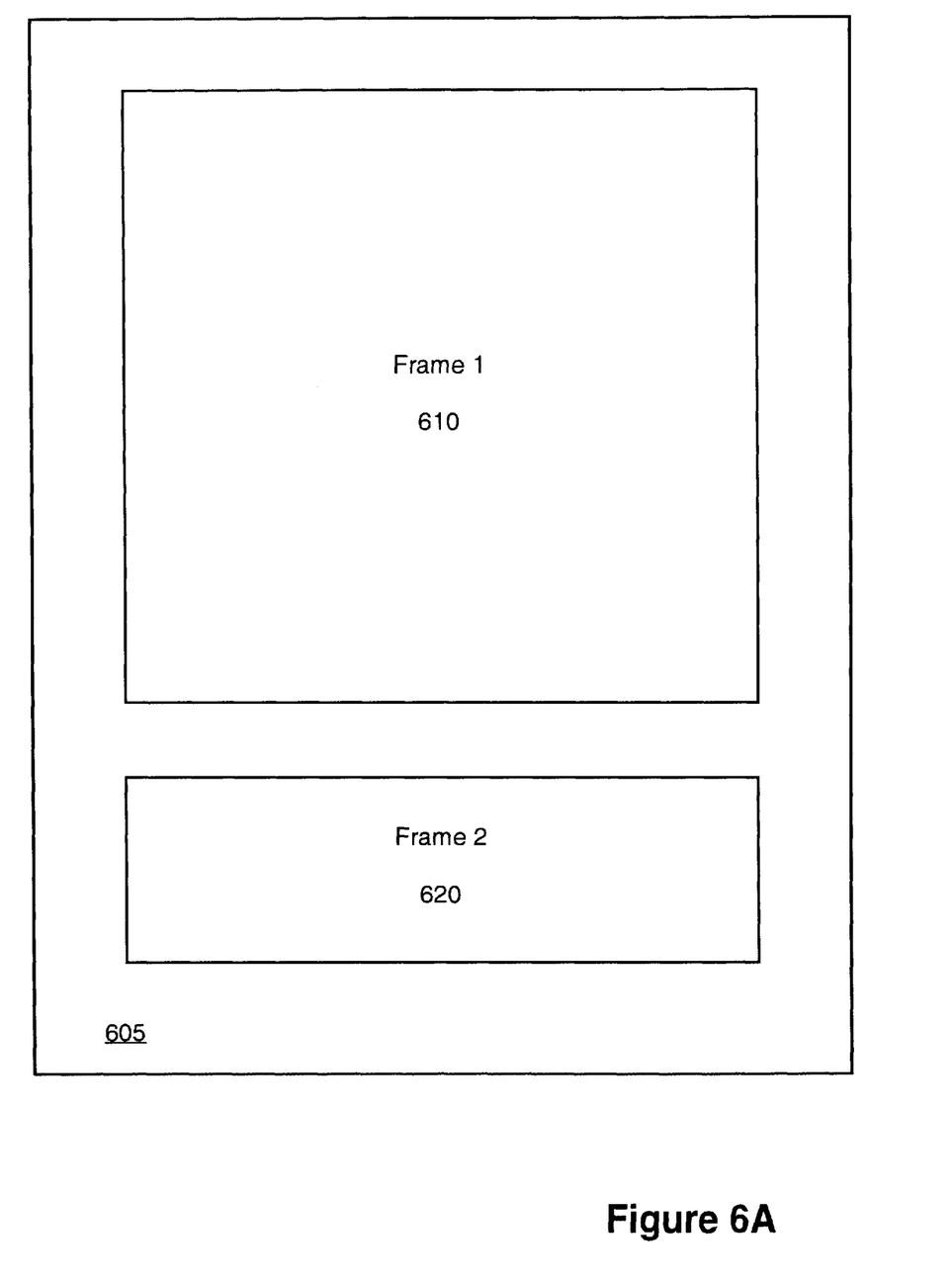
FIGS. 6A–B show the frame architecture of HTML pages of an exemplary embodiment of the invention.

The server 110, in step 520, responds to the selection message, by causing that selected work item object to be distributed to the client. Under preferred Java implementations this entails reading the object 117 from database 125 using its object identification and establishing IOR object references on the client 130 to reference an ORB which in turn references the object implementation of the work item object 117 on the server 110. (IOR object references are known.) The database 125 stores the objects 117 to provide object persistence. Once distributed, the client may create a local copy (not shown) of the object 117 to improve performance. Moreover, as part of step 520 the task manager logic instructs the browser 410 to open a new browser window and to load the window with a predefined HTML page. FIG. 6A shows an exemplary structure of the predefined page 605 having two frames 610 and 620.

The logic progresses to step 522 by which time the task manager has learned of a URL reference to an HTML page that corresponds to the client application for the activity being performed. (See step 505) The URL-referenced page includes a reference to a predefined applet 630, Java script logic 640, and a HTML page description 650 having various HTML "tags" and other HTML components. (See FIG. 6B) The predefined applet, referenced by 630, is loaded in one frame, e.g., 620, of the predefined page 605, and the page description and script logic 640 are loaded in the other frame, e.g., 610.

Figure 6B:
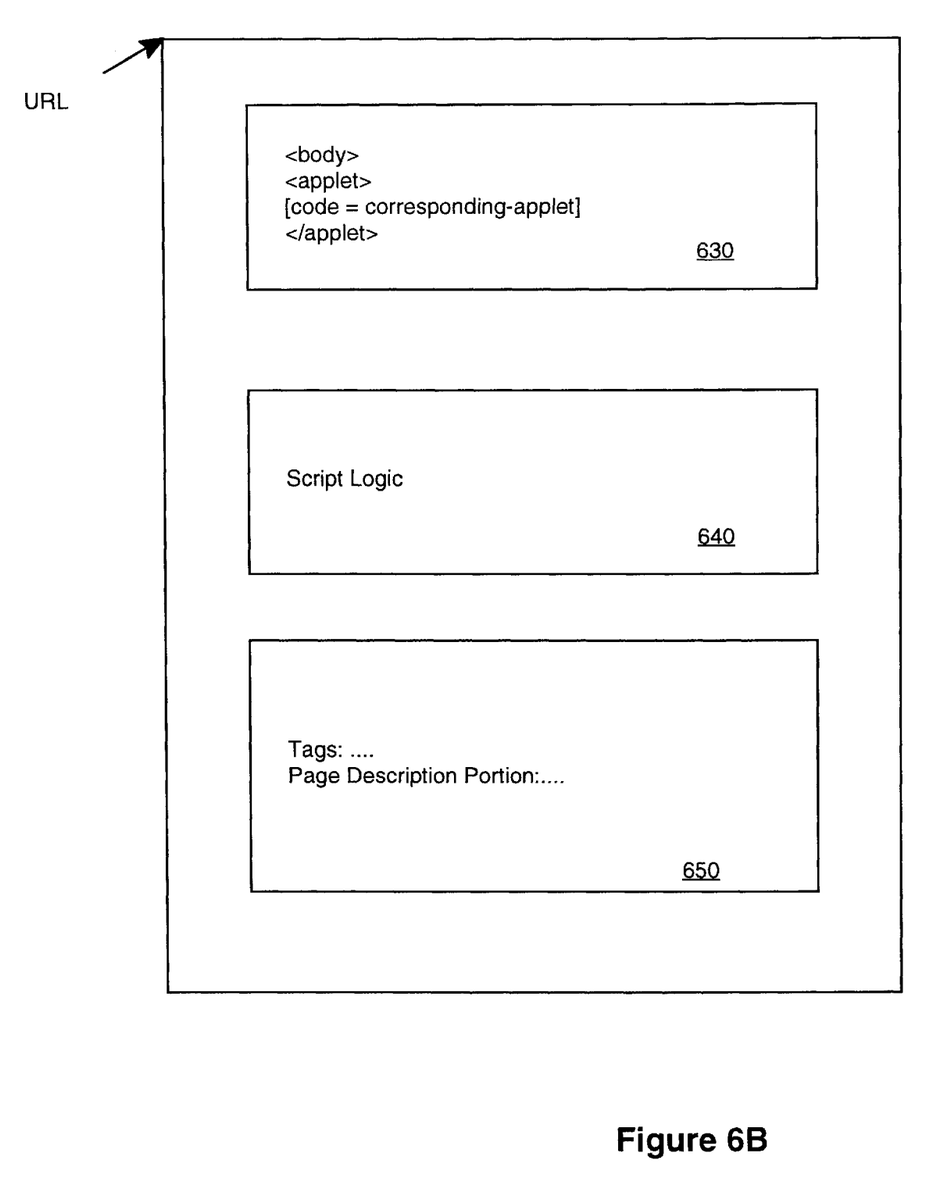

The predefined applet referenced by 630 includes the logic for the various application controls. The applet 630 further includes the logic for communicating with the work item object 117 that is eventually distributed. This logic uses conventional techniques to establish the various IOR object references for the CORBA-based communication. The applet 630 would further include logic for creating and maintaining a local copy of the object 117.

In step 523 the predefined applet establishes the object references, mentioned above. The preferred embodiment of a work item 117 is a distributed Java object having a Java hash table as a component to contain the "contents" of the work item. The interface to the work item object includes "get" and "set" methods to the indexable hash table, for example, to obtain or set the list of keys or to obtain or get a particular key with a value.

In step 525, the script logic 640 determines the tags used by the HTML portion 650 to be displayed in frame 620, and uses the tag names as the keys or indexes to the Java hash table of the work item object 117. Specifically, the script logic 640 iterates through each tag of the HTML page and uses the tag as key to the Java hash table to retrieve the corresponding value of the key/value pair. The retrieved value is displayed in the HTML frame 620 as specified by the HTML portion 650, and the eventually displayed information is used by the participant in some activity-dependent manner. For example, the participant may write to certain of the fields of the displayed page, or add values to displayed fields that have not yet been added to the work item object 117.

The client, and specifically the participant, performs the activity, in step 530, and "sends" or "saves" a work item object 117 to the server 110. In performing the activity, the client application may have read or written data in the work item object 117 and even effectively changed the data type definition of the work item object. The "sending" of the object 117 does not actually send the whole object. Instead, sending entails updating or overlaying the data in the object implementation of the work item object 117 on server 110 and informing the server 110 that the actor has completed the activity. The server 110 may then update the database 125 with the "saved" work item. A preferred embodiment thus has the work item objects 117 at each stage of activity stored in database 125 with a unique object ID.

The logic then proceeds to step 599 which ends the activity. The server 110 and flow engine 115 would now cooperate with the client to determine whether subsequent activity is needed and if so schedule such subsequent activity accordingly. Under a preferred embodiment, the client asks the flow engine 115 for the set of possible next activities. The flow engine 115 interprets the definition 107, along with other information stated above, and sends the set to the client. The client then decides which activity should be selected next from the above. This may be performed by a participant selecting certain controls on a GUI or may be performed with software logic, for example, when an agent 120 is the actor. Under a preferred embodiment, the server 110 makes scheduling decisions when the actor is an agent. The client then builds and associates a "routing slip" (not shown) to be associated with the work item 117, and the server 110 utilizes the routing slip to determine which activity should receive new work item events to trigger activity, as described above with regard to FIG. 5. The work item 117 has been stored in database 125 with an ID that uniquely identifies the work item 117 at a given completion stage of activity. This ID is used in sending the new work item event and in refreshing the in-box. This scheduling and routing would continue until the workflow is completed as defined by the process definition.

3. Distributed Subflows

The logic and mechanisms for providing and supporting distributed subflow processing are described in a U.S. Patent Application, entitled Workflow Management System and Method with Distributed Subflows, which is filed on the same date as this application and assigned to the same assignee and which is hereby incorporated by reference in its entirety. For the sake of brevity, that description is not repeated here. In short, with distributed subflows, a subflow definition is created at a remote server, and a receiving workflow definition is created transparently to the developer if the subflow is marked for distribution. The distributed subflow may then be used by a developer in defining an initiating workflow, which may execute at an entirely different machine and execution context. The receiving subflow includes a passer agent and a return agent that are used in distributing work items to and from the distributed subflow and the initiating workflow. In this fashion, the subflow may be defined and carried out at business locations that have the appropriate expertise, rather than centralizing the thinking and processing to one location. Security mechanisms are provided to protect against eavesdropping and to ensure that the work items and the actors are authentic. The distributed subflow mechanisms are desirable but not essential to the instant invention.

4. Personal Subflows a. Defining a Personal Subflow

Subflows are defined with a process definition tool 105 analogously to the manner in which workflows are defined, for example, by creating a graphical representation of the activities, inter-relationships and actors. An exemplary embodiment of the invention defines subflows to have one entry point and one exit point. Moreover, an entry point cannot be a "starting point" of a workflow. A starting point is a point in a workflow at which a user can start the workflow by attaching or assigning a work item to a corresponding activity. Subflows thus cannot be directly initiated by a participant. In this regard these constraints differ from the definition of a workflow which has no such constraints.

A "personal subflow" imposes some additional conditions on its definition. Specifically, a personal subflow does not allow for the explicit specification of an actor that will perform the activity. It also requires that the subflow be defined so that the defined sequence of personal subflow activities may be performed by one participant.

In defining the activities that constitute a personal subflow, the developer specifies the activities to be performed and associates predefined HTML pages with the activities analogously to that described in section 2 above. The HTML pages effectively display forms that display some or all of the work item contents to the participant and that are used to receive participant-entered data.

In defining the personal subflow, the developer may specify rule-based branch conditions to specify which activity should be a next activity given a set of existing conditions. The given set of conditions may be specified as an expression defined according to a predefined grammar and that has work item contents data as variables in the expression. Moreover, a user interface may be provided to facilitate the developer's entry of valid expressions. The expressions so made may be used to express expert-based rules to facilitate the participant's performance of the personal subflow activity. The actual expressions are implementation dependent.

Thus the personal subflow may be defined to display a set of HTML pages in response to participant-entered values. And the sequence of the HTML pages may be governed by the developer-specified rules and the participant-entered data, i.e., work item contents data.

Once so defined, the personal subflow is stored so that it may be used later in defining a workflow. The workflow eventually defined may include the personal subflow and assign it to a given participant, to a work group, or to other workflow entities. When the personal subflow is included in a definition, the actor to which the personal subflow is assigned is then bound with the personal subflow.

b. Personal Subflow Logic

Figure 7:
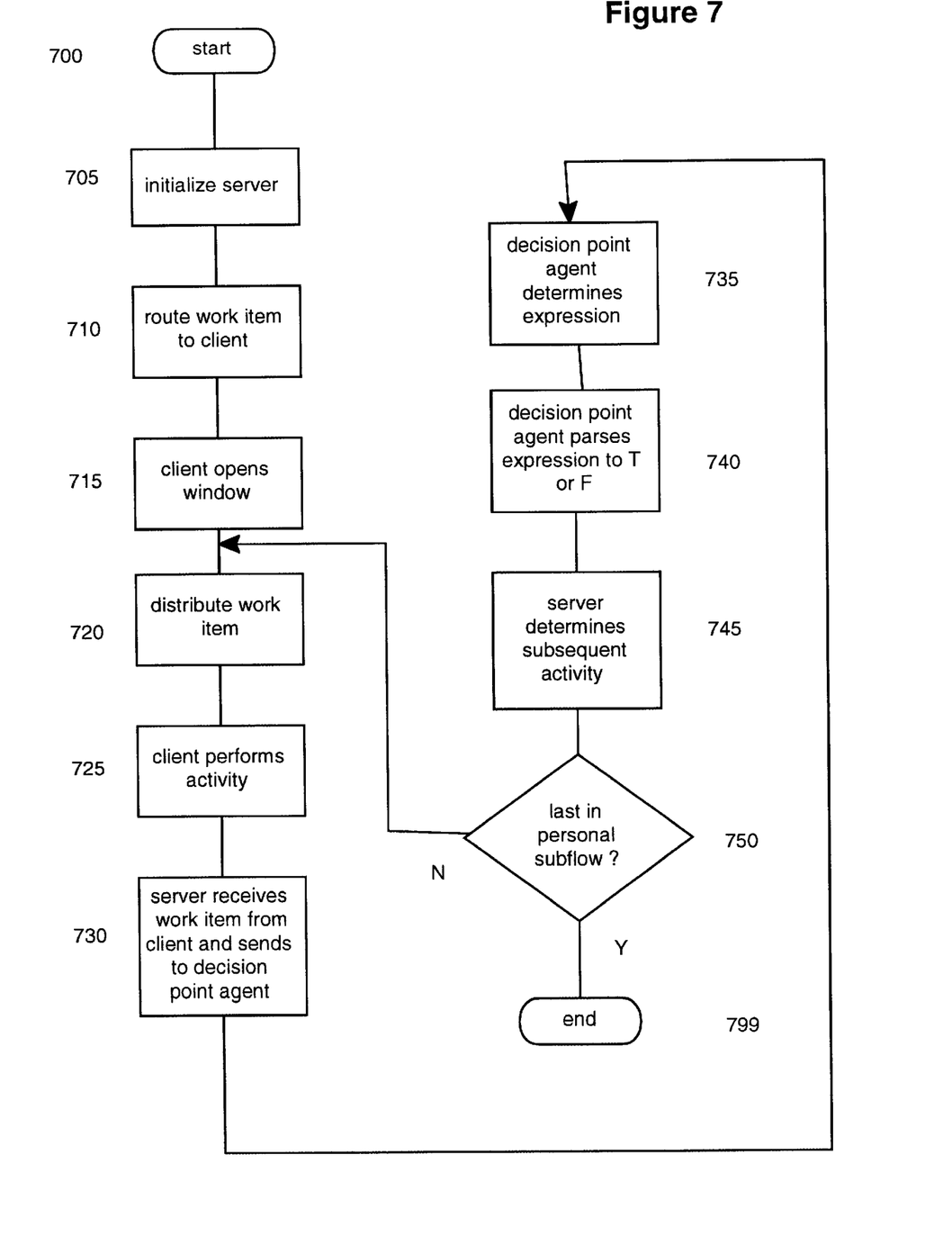
FIG. 7 shows the logic of personal subflows of an exemplary embodiment of the invention.

FIG. 7 is a flow chart showing the logic for personal subflows. The logic starts in step 700 and proceeds to step 705 in which the server 110 is initialized with a workflow definition that contains an activity to be performed by a personal subflow. This would involve the instantiating of a decision point agent, if one is not yet instantiated, and initializing the agent with the branch expressions defined for the personal subflow.

In step 710, a work item is eventually routed to the participant who is defined within the workflow as the actor to perform the personal subflow and the participant selects the work item of interest.

In step 715, the client opens a browser window and loads it with a predefined HTML page like that shown in FIG. 6A using the same techniques as used for client-based applications.

In step 720 the client and server cooperate to distribute the work item of interest using the same techniques as used for client-based applications. This distribution could involve morphing as a desirable but not essential aspect and would involve the loading of an initial personal subflow HTML page into one of the frames of the predefined page using the same techniques as used for client-based applications. The other frame could be loaded with a user control applet like that used for client-based applications but including controls to navigate to a next or previous personal subflow activity.

In step 725 the participant performs the activity by filling out the HTML display, and then activates a user control such as next or previous.

In step 730 the server obtains the work item just sent to it as a result of activating the user control and forwards the work item to a decision point agent.

In step 735 the decision point agent uses the work item to determine which branch expression corresponds to the work item. This is possible because the work items are identified with a naming convention that identifies a given stage of completion of the work item within a workflow, and thus the decision point agent may map the name to a branch expression associated with the current activity.

In step 740 the decision point agent parses the expression in view of the work item contents and provides a true or false conclusion to the server.

In step 745 the server uses the true of false conclusion and interprets the work flow definition to determine which subsequent activity corresponds to a true conclusion and which corresponds to a false conclusion.

Based on the server's determination, the server in step 750 schedules a subsequent activity by identifying a corresponding work item and corresponding HTML display, if any. If the subsequent activity is another activity within the defined personal subflow the logic branches back to step 720, which will cause the logic to be repeated but will cause the loading of the newly-associated HTML page to be displayed in the open browser window frame. If the subsequent activity is not within the personal subflow, the personal subflow ends in step 799.

Under a preferred embodiment, the controls associated with a personal subflow are extended to include a "next" and a "back" control to navigate, respectively, to a subsequent activity of the personal subflow, or to a previous activity of the personal subflow. Under one embodiment of the invention, the "next" control causes the logic flow described above, i.e., evaluating of a branch expression to determine the specific activity to perform next, and the "back" control may be used to "roll-back" the update of a work item operation. ("Roll-backs" are known in the field of transaction processing.) Alternatively, the next and back controls may be used to update the work item contents and such information would then be used by the decision point agent in its branch expression.

Moreover, other application-specific logic may be included in addition to the HTML forms. Among other things the personal subflow may involve agents as they do not involve HTML pages and will not corrupt the participant's personal subflow user interface. Moreover, the user interface may be extended to include Java script logic or applets to further supplement the application logic associated with an activity.

c. Example Personal Subflow

A typical use of a personal subflow might best be described by an example. Assume that the personal subflow to be developed is a sequence (not necessarily unidirectional) of activities for a field representative (i.e., a participant) to diagnose a network problem. The personal subflow thus might involve the display of a given HTML page providing some information to the field representation and querying the representative for other information, which the field representative supplies. After typing the information into the corresponding fields of the HTML display, the information is "sent" analogously to sending a work item in a "normal" client-based application. However, rather than causing a work item to be sent to a subsequent actor, the information is sent to the server which in turn sends the information to the "decision point agent" for processing in conjunction with a branch expression corresponding to the current activity. The decision point agent parses the expression and the participant-provided information (by way of the server). The agent returns a true or false conclusion to the branch expression to the server which from this determines what the next activity should be, e.g., to determine what next HTML page to display to query for more information to aid the diagnosis given the sent information or to provide a diagnosis. The rules expressed in the decision point agent could be developed by an expert in the field of network diagnosis and thus can provide this expertise to a less knowledgeable or less experienced participant.

e. Decision Point Agent Logic

Under a preferred embodiment, a personal subflow is defined with the assistance of a server-specific agent called a "decision point agent." The decision point agent includes an engine for processing statements according to a predefined grammar. The predefined grammar allows a developer to specify rules underlying the personal subflow. A special user interface may be used to facilitate the developer in entering valid statements according to the grammar, e.g., with a plurality of toggle controls corresponding to the grammar's elements and keywords. Each valid statement entered through the user interface will result in a conclusion of "true" or "false." These conclusions may be used in determining which subsequent personal activities should be launched. Thus, if a conclusion from an activity is "true" a first HTML page may be loaded, which may display a first subset of work item contents data and which may request a first set of new information from the participant; and if a conclusion from an activity is "false" a second HTML page may be loaded, which may display a second subset of work item contents data and which may request a second set of new information from the participant.

f. Branch Expression Grammar

The grammar will only accept expressions that evaluate to 'true' or 'false'. String, Number and Date are the only variable types accepted. The only date format the grammar will accept is mm-dd-yyyy. To use variables in the expression, the variables must exist in the work item object before evaluating the expression.

Examples of valid expressions are the following:

'how'='hello'

((5>3) & (4=max(3,3)))

09-08-1997=date()

String:name='netflow', date:startDate=09-09-1997
//name and startDate
are variables The grammar for an exemplary decision point agent is described below in BNF notation. (BNF notation is known in the art.) This grammar is used in entering valid rules and by the decision point agent's parsing engine in attempting to reach conclusions from a given activity.

Digit ::=("0"–"9")

Integer ::=(<Digit>)+

PosNum ::=<Integer>|<Integer>("."<Integer>)?|"."<Integer>

Num::=<PosNum> alphabet ::="a"–"z","A"–"Z"

Id ::=<alphabet>(<alphabet>|<Digit>)*

StringId ::=""""<Id>""""

Date ::=<Digit><Digit>"-"<Digit><Digit>"-"<Digit><Digit><Digit><Digit>

The operators allowed are

Arithmetic Operators

ADD ::="+"

SUB ::="-"

MUL ::="*"

DIV ::="/"

Relational Operators

LT ::="<"

GT ::=">"

EQ ::="="

LTE ::="<="

GTE ::=">="

NEQ ::="!="

Logical Operators

AND ::="&"

OR ::="|"

NOT ::="!"

Prefixes for variables

NUMBERV ::="Number:"

STRINGV ::="String:"

DATEV ::="Date:"

NumericElement ::=<Num>|"("<NumericSum>")"|<NUMBERV><ID>|<Function>

NumericSum ::=<NumericFactor>(<ADD>|<SUB>)<NumericFactor>

NumericFactor ::=<NumericElement>(<MUL>|<DIV>)<NumericElement>

StringElement ::=<StringId>|<STRINGV><Id>|"("<StringSum>")"|<Function>

StringSum ::=<StringElement><ADD><StringElement>

DateElement ::=<Date>|<DATEV><Id>|<Function>

Function ::=<ID>"("[(<NumericSum>|<StringSum>|<DateElement>) (","(<NumericSum>|<StringSum>|<DateElement>))*]")"

NumericLogicalCompare ::=<NumericSum>=(<LT>|<GT>|<EQ>|<LTE>|<GTE>|<NEQ>)<NumericSum>

StringLogicalCompare ::=<StringSum>(<EQ>|<NEQ>)<StringSum>

DateLogicalCompare ::=<DateElement>(<LT>|<GT>|<EQ>|<NEQ>)<DateElement>LogicalCompare::=<NumericLogicalCompare>|<StringLogicalCompare>|<DateLogicalCompare>|<NOT>"("<LogicalExpression>")"|"("<LogicalExpression>")"

LogicalExpression ::=<LogicalCompare>(<AND>|<OR>)<LogicalCompare>

5. Other Embodiments

The above embodiment largely focused on implementations that used object-oriented design, and particularly Java implementations. Though these embodiments provide certain advantages non-object-oriented techniques may be employed effectively, such as linear programming.

Likewise, Java is interpreted at run-time, not precompiled, into native mode instructions for the particular computing platform. Nonetheless, though Java offers platform independence, implementations that are platform specific or that are implemented with executable native mode instructions may be employed effectively.

The storing of work objects within the database provides certain advantages by way of object persistence. Certain languages and environments, however, have satisfactory persistence and these systems may be employed effectively without requiring as many transactions to the database.

Many other architectures may be used for the routing of work items, for example, ones in which the engine performs all scheduling activities rather than cooperating with actors.

Moreover, though reference was made to WfMC specifications, there is no requirement or inherent limitation to implementing systems according to the WfMC specifications. In fact, embodiments were described that differed from the specification in material ways, e.g., shared engines among workflows.

The grammar described may be modified to include more robust constructs such as additional token and expressions.

The user controls may be modified in conjunction with the server to implement roll-back functions in response to back commands.

Having described an exemplary embodiment, it should be apparent to persons of ordinary skill in the art that changes may be made to the embodiment described without departing from the spirit and scope of the invention.

What is claimed is:

1. A workflow system having personal subflows, comprising:
    a workflow definition including one or more activities to be performed by a personal subflow, wherein a participant among a plurality of workflow participants performs the one or more personal subflow activities, and wherein each of the one or more personal subflow activities 1) presents one or more display pages to the participant, 2) accepts participant entered data, and 3) evaluates the participant entered data in accordance with branch expressions associated with each of the one or more personal subflow activities;
    a server for interpreting the workflow definition and facilitating the scheduling and routing of work items in the system;
    a client to receive a work item from the server and to display information therefrom to the participant;
    a decision agent to cooperate with the server in the scheduling of work items by considering work item data and a branch expression associated with a current personal subflow activity.

2. The system of claim 1 wherein the client includes
    logic to receive the participant entered data and to modify the work item as determined by the participant entered data, and
    logic to provide the modified work item to the server, and wherein the server includes logic to forward the modified work item to the decision point agent so that the agent may consider work item data therein.

3. The system of claim 2 wherein the client includes HTML logic to display a HTML display associated with each personal subflow activity and to update the HTML display with information contained in the work item.

4. The system of claim 3 wherein the HTML logic includes logic to open a browser window to display an initial HTML display for an initial personal subflow activity and logic to refresh the browser window with subsequent HTML displays for subsequent personal subflow activities.

5. The system of claim 3 wherein the HTML logic includes logic to navigate back to a previous personal subflow activity and previous HTML display.

6. The system of claim 1 wherein the client cooperates with the participant and wherein the personal subflow can be used by any of a plurality of participants.

7. The system of claim 1 wherein the client includes logic, cooperative with the server, to navigate to a next personal subflow activity.

8. The system of claim 1 wherein the client includes logic, cooperative with the server, to navigate to a previous personal subflow activity.

9. A method of performing a workflow having personal subflows, comprising:
    receiving a workflow definition including one or more activities to be performed by a personal subflow, wherein a participant among a plurality of workflow participants performs the one or more personal subflow activities, and wherein each of the one or more personal subflow activities 1) presents one or more display pages to the participant, 2) accepts participant entered data, and 3) evaluates the participant entered data in accordance with branch expressions associated with each of the one or more personal subflow activities;
    a server interpreting the workflow definition to facilitate the scheduling and routing of work items;
    a client receiving a work item from the server and displaying information therefrom to the participant;
    a decision agent cooperating with the server in the scheduling of work items by considering work item data and a branch expression associated with a current personal subflow activity.

10. The method of claim 9 further comprising
    the client receiving the participant entered data and modifying the work item as determined by the participant entered data, and
    the client providing the modified work item to the server, the server forwarding the modified work item to the decision point agent so that the agent may consider work item data therein.

11. The method of claim 10 further comprising the client displaying a HTML display associated with each personal subflow activity and updating the HTML display with information contained in the work item.

12. The method of claim 9 further comprising the client cooperating with a participant and wherein the personal subflow can be used with any of a plurality of participants.

13. The method of claim 12 further comprising
    the client opening a browser window to display an initial HTML display for an initial personal subflow activity and refreshing the browser window with subsequent HTML displays for subsequent personal subflow activities.

14. The method of claim 9 further comprising
    the client cooperating with the server to navigate to a next personal subflow activity.

15. The method of claim 9 further comprising
    the client cooperating with the server to navigate to a previous personal subflow activity.

16. A set of computer processable instructions on a computer readable medium, comprising:
    server instructions for interpreting a workflow definition and facilitating the scheduling and routing of work items, the workflow definition including one or more activities to be performed by a personal subflow, wherein a participant among a plurality of workflow participants performs the one or more personal subflow activities, and wherein each of the one or more personal subflow activities 1) presents one or more display pages to the participant, 2) accepts participant entered data, and 3) evaluates the participant entered data in accordance with branch expressions associated with each of the one or more personal subflow activities;

client instructions to receive a work item from a server and to display information therefrom to a participant;

decision agent instructions to cooperate with the server in the scheduling of work items by considering work item data and a branch expression associated with a current personal subflow activity.

17. The set of computer processable instructions of claim 16 wherein the client instructions includes instructions to receive the participant entered data and to modify a work item as determined by the participant entered data, and instructions to provide the modified work item to a server, and wherein the server instructions include instructions to forward the modified work item to a decision point agent so that the agent may consider work item data therein.

18. The set of computer processable instructions of claim 17 wherein the client instructions include HTML instructions to display a HTML display associated with each personal subflow activity and to update the HTML display with information contained in the work item.

19. The set of computer processable instructions of claim 18 wherein the HTML instructions include instructions to open a browser window to display an initial HTML display for an initial personal subflow activity and instructions to refresh the browser window with subsequent HTML displays for subsequent personal subflow activities.

20. The set of computer processable instructions of claim 16 wherein the client instructions cooperate with a participant and wherein the personal subflow can be used by any of a plurality of participants.

21. The set of computer processable instructions of claim 16 wherein the client instructions include instructions, cooperative with the server instructions, to navigate to a next personal subflow activity.

22. The set of computer processable instructions of claim 16 wherein the client instructions include instructions, cooperative with the server instructions, to navigate to a previous personal subflow activity.

23. The set of computer processable instructions of claim 16 wherein the server instructions are Java instructions.

24. A method of performing a workflow having personal subflows, comprising:

routing a work item to a participant defined within a workflow as the actor to perform a personal subflow defined by personal subflow activities and branch expressions associated with the subflow activities;

a server interpreting the workflow definition to facilitate the scheduling and routing of work items;

a client receiving a work item from the server and displaying information therefrom to a participant;

a decision agent cooperating with the server in the scheduling of work items by considering work item data and a branch expression associated with a current personal subflow activity.

25. The method according to claim 24 further comprising the client receiving data from the participant and modifying the work item with the participant data, and the client providing the modified work item to the server, the server forwarding the modified work item to the decision point agent so that the agent may consider work item data therein.

26. The method according to claim 24 further comprising the client displaying a HTML display associated with a personal subflow activity and updating the HTML display with information contained in the work item.

* * * * *